United States Patent Office 3,702,873
Patented Nov. 14, 1972

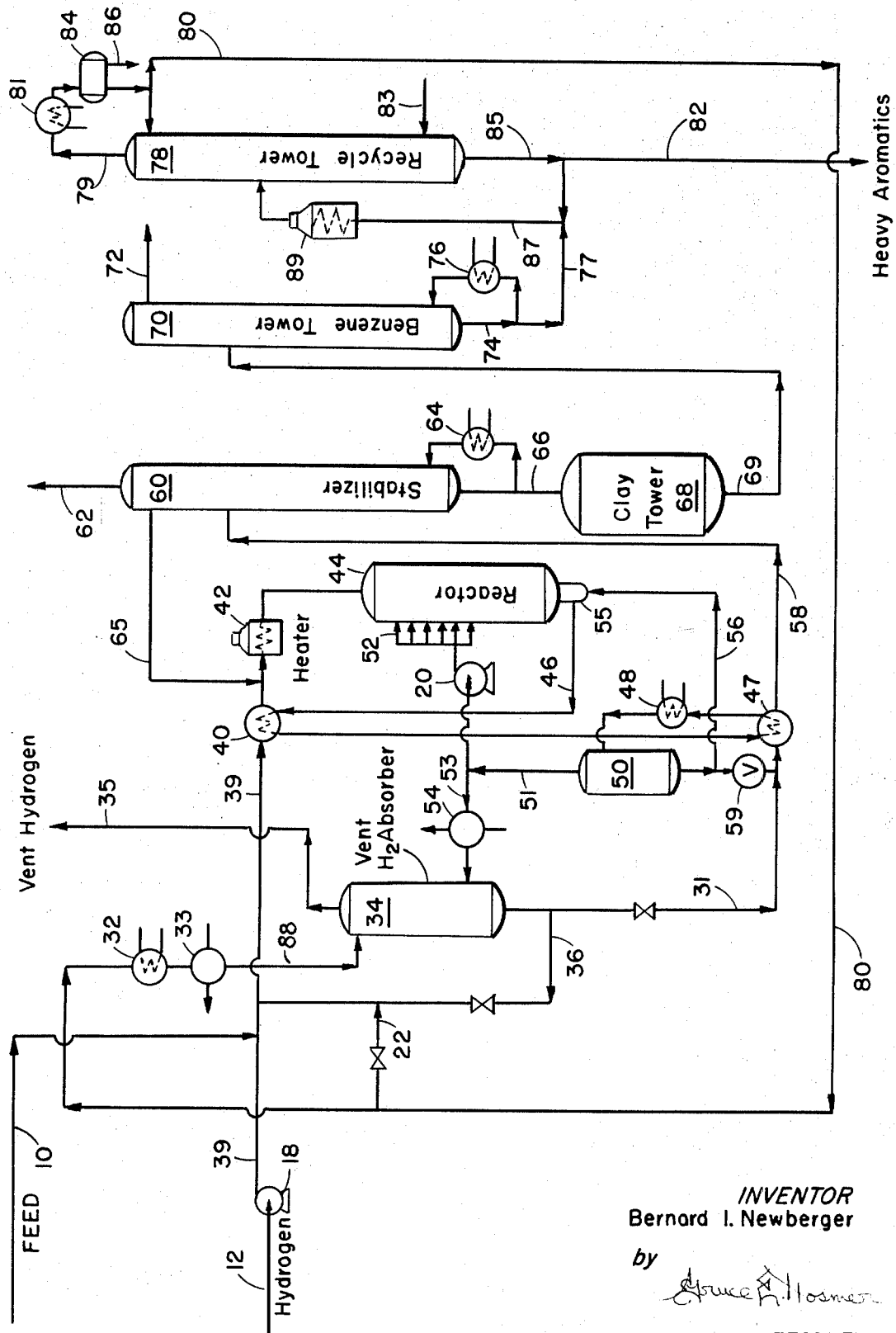

3,702,873
HYDRODEALKYLATION WITH INDEPENDENT
LEAN OIL RECYCLE
Bernard I. Newberger, Brooklyn, N.Y., assignor to
Hydrocarbon Research, Inc., New York, N.Y.
Filed Oct. 12, 1970, Ser. No. 79,793
Int. Cl. C07c 3/58
U.S. Cl. 260—672 R                      2 Claims

ABSTRACT OF THE DISCLOSURE

The lean oil fed to the vent hydrogen absorber in a hydrodealkylation process is maintained independent of the output from the reactor wherein the hydrodealkylation feed is composed of the $C_6$ to $C_9$ aromatics cut and contains substantial amounts of paraffins and naphthenes boiling in the benzene-toluene range. The total recovery of benzene is maximized under such a system.

---

One of the major problems associated with the design of hydrodealkylation reactors as set forth in U.S. Pat. No. 3,287,431, has been temperature control. This is due to the highly exothermic nature of the reaction. Too high a temperature will result in loss of product yield as well as seriously increasing metallurgical problems. Too low a temperature will require an excessively large reactor volume. Consequently, the reactor must be quenched to maintain temperatures close to the optimum throughout the reactor.

Another equally important consideration in a process for the hydrodealkylation of alkylated aromatic hydrocarbons is the handling of the effluent vapor from the reactor. This vapor contains a substantial amount of the benzene produced. The exact amount is a function of the amount of net effluent gas as well as the temperatures and pressure of the effluent flash drum. However, the benzene in this effluent can be in the range of 2 to 10 percent of the total benzene production. It is, therefore, essential to the efficiency of the overall process that this benzene is recovered.

Although the prior art has been able to recover this benzene where the hydrocarbon feed is liquid toluene, of the nitration grade, and the feed can therefore be used as the lean oil for benzene recovery in the vent hydrogen absorber, new problems have arisen when the feed to the hydrodealkylation unit contains benzene or non-aromatic hydrocarbons of the benzene boiling range or is in the vaporous state. Where the feed is in the vaporous state it cannot be used as a lean oil in the absorber unless liquefied. This problem of suitable lean oil for benzene absorption is further complicated where the vent hydrogen from the absorber is to be purified and recycled for use as part of the feed hydrogen to the hydrodealkylation reaction zone. Where there is benzene or non-aromatics in the lean oil feed, insufficient amounts of the benzene in the vent hydrogen absorber overhead are removed and so benzene is carried out in the vent hydrogen. This benzene is lost if the hydrogen is burned or it will freeze up in any subsequent hydrogen purification unit.

SUMMARY OF THE INVENTION

In this invention the hydrodealkylation of alkylated aromatic hydrocarbon feed is made possible where the feed cannot be fed directly to the vent hydrogen absorber as the lean oil. At the same time, it is possible to achieve an optimum recovery of benzene. Feeds unsuitable as lean oil are in the vaporous state or are comprised of the $C_6$ to $C_9$ aromatics cut and contains greater than about one percent of paraffins and naphthenes boiling in the benzene-toluene range.

The $C_6$ to $C_9$ aromatics cut is used herein to mean alkylated aromatic hydrocarbons such as benzene, toluene, xylene, ethylbenzene, trimethylbenzene and cumene. The paraffins and naphthenes, hereinafter referred to as non-aromatics, boiling in the benzene-toluene range are of the type n-heptane, 2-methylhexane, 2-4 dimethyl pentane, cyclohexane, methyl-cyclohexane and dimethyl-cyclopentane.

As such alkylated aromatic hydrocarbon feeds are more suitably fed directly to the reaction zone there is insufficient lean oil available, solely from unconverted aromatic feed, for use as the benzene absorbent in the vent hydrogen absorber. A lean oil supply based upon unconverted aromatic feed is too dependent on the conversion in the reactor and therefore quite susceptible to fluctuation. This vent hydrogen absorber is essential to a hydrodealkylation process in order to recover any aromatics, especially benzene, which may be carried off in the vent hydrogen from the hydrodealkylation reaction zone. In this invention a lean oil recycle is established which is independent of the reactor output while at the same time the alkylated aromatic hydrocarbon feed is not used directly as the lean oil source. The lean oil is liquid and is primarily composed of alkylated aromatics and less than one percent benzene.

Under this hydrodealkylation system the feeds to be hydrodealkylated are not suitable for direct use as the lean oil in the vent hydrogen absorber. If the feed is vaporous it is unsuitable as it cannot be used as an absorption medium and if the feed contains non-aromatics of the benzene boiling range the benzene in the liquid stream leaving the vent hydrogen absorber is contaminated by the non-aromatics thereby precluding a high purity benzene recovery. A benzene rich feed situation would make the vent hydrogen unsuitable for recycle as part of the feed hydrogen to the hydrodealkylation system as the vent hydrogen would carry benzene which would freeze up if one tried to cryogenically purify the hydrogen.

In this present invention the reaction zone effluent vapor is contacted with a part of the total lean oil recycle. The contacting takes place in a conventional absorber operating between about 40° and 120° F. The lean oil to vapor feed ratio is preferably maintained in a molar ratio range of about .005 to 0.25 while the system pressure is in range of 500 to 700 p.s.i.g.

In this invention the benzene tower bottoms are fed to a tower which produces toluene along with other alkylbenzenes, as the overhead. This tower provides a lean oil without heavy aromatics for use in the vent hydrogen absorber which is used to remove benzene from the vent hydrogen.

The main purpose of this tower is to provide a means of concentrating heavy aromatics in the bottoms for the purpose of purging them. These heavy aromatics can build up to an extent that would cause operating difficulties. Purging is then necessary to control their level, but purging directly from the bottom of the benzene tower could cause a far greater yield loss than this present scheme.

High quality benzene is produced by taking a sidestream, consising of benzene and hydrocarbon compounds or impurities which form azeotropic boiling mixtures with benzene, from the stabilizer tower and introducing this sidestream into the reaction zone wherein the impurities are destroyed by hydrocracking them to light hydrocarbon gases. Thus premium quality benzene is produced at higher yields than would be obtainable if the azeotropic mixtures were separated by fractionation.

The object of this invention relates to a process for the hydrodealkylation of alkylated aromatic hydrocarbons to maximize the aromatics produced and maximize the aromatics recovered from the vent hydrogen while maintaining a maximum toluene to benzene ratio in the hydrogen being recycled through the cryogenic purification unit.

Another object of this invention is to disclose a hydrodealkylation process that will convert alkylated aromatic hydrocarbon feeds to benzene where the entering feed is in the vaporous state or the feed contains benzene or non-aromatic hydrocarbons.

Yet another object of this invention is to hydrodealkylate pyrolysis gasoline to benzene.

A further object of this invention is to establish a lean oil recycle to the vent hydrogen absorber that is independent of the reactor output.

Further objects of this invention will become apparent from the following description of the preferred embodiment thereof and as more particularly shown in the attached drawing.

DESRIPTION OF THE DRAWING

The drawing is a schematic flow diagram of a hydrodealkylation process suitable for handling feeds composed of the $C_6$ to $C_9$ aromatics cut and containing substantial amounts of non-aromatics.

DETAILED DESCRIPTION OF PREFERRED EMBODIMENT

Hydrogen is passed in line 12 and through compressor 18 to line 39 prior to combining with the feed. The alkylated aromatic hydrocarbon feed passes in line 10 and mixes with the hydrogen feed in line 39.

Alkylated aromatic hydrocarbons containing benzene or non-aromatic hydrocarbons are suitable as feed materials. Liquid or vaporous alkylated aromatic hydrocarbons with greater than one percent benzene are preferred feeds while feeds which comprise the $C_6$ to $C_9$ aromatics cut and substantial amounts of non-aromatics are more preferred and vaporous hydrogenated pyrolysis gas is an example of the most preferred feed type. Hydrogenated pyrolysis gasoline has a composition such as set forth in Table I. Diolefins and olefins contained in the feed must be removed to make a feed suitable for use in the hydrodealkylation system and it is desirable to minimize the thiophenic sulfur in the feed stream. Such pretreatment steps are not shown as a part of this system as they have been set forth in the prior art.

TABLE I

|  | Weight percent |
| --- | --- |
| $C_5$-paraffins and -naphthenes | 3.0 |
| $C_6$-paraffins and -naphthenes | 2.9 |
| $C_7$-paraffins and -naphthenes | 2.6 |
| $C_8$-paraffins and -naphthenes | 7.7 |
| $C_9$-paraffins and -naphthenes | 0.1 |
| Benzene | 34.8 |
| Toluene | 21.2 |
| Xylene | 14.2 |
| Ethylbenzene | 9.8 |
| $C_9$-aromatics | 3.3 |
| $C_{10}$-aromatics | 0.4 |
|  | 100.0 |

The combined hydrogen and feed in line 39 is heated at 40 by exchange against reactor effluent in 46. At this point a stream 65 from the stabilizer 60 is added and the total reactor feed is heated to about 1200° F. in fired heater 42. It then enters the reactor 44.

The reactor 44 is an internally insulated chamber containing no catalytic surfaces. The pressure in this reactor is maintained at about 600 p.s.i.g. The reactor is so sized that the residence time of the total feed is in the range of about 20 to 40 seconds. The temperature profile in the reactor is controlled by adding quench gas at appropriate points in the reactor such as 52. The temperature profile is so controlled that it does not exceed 1350° F. at any point within the reactor. It is also controlled so that about 75 percent of the alkylated aromatic hydrocarbons in the total feed is converted. At the outlet 55 the reactor effluent is quenched to about 1200° F. by liquid quench 56. While quenching in this manner is sufficient to stop the reactions which occur in the reactor 44 it does permit reactions to take place which produce certain hydrocarbon impurities which form azeotropic boiling mixtures with benzene.

The reactor effluent 46 is then cooled by exchange against reactor feed in 39 at 40, by exchange against stabilizer feed at 47, and by water at 48. It is then separated into liquid and vapor in flash chamber 50. Part of the flashed vapor in 51 is passed through compressor 20 and is used to quench the reactor at 52. The net vapor is taken at 53 and cooled to about 60° F. in exchanger 54 by a refrigerant. It then goes to the vent hydrogen absorber 34 and the vent hydrogen leaves the unit at 35.

Part of the liquid from flash chamber 50 is taken through line 56 and used to quench the reactor effluent at 55. The net liquid from 50 passes through and is reduced in pressure through valve 59 combining with rich oil in 31 and is heated at 47 by exchange against reactor effluent and then goes by 58 to the stabilizer 60.

Light hydrocarbon gases which are present in the stabilizer feed 58 are taken overhead of the stabilizer 60 at 62. In addition, a small sidestream is taken at 65, a few trays from the top, and returned to the reactor 44. This side stream is primarily benzene, but contains hydrocarbon impurities, formed most probably after the reactor quench, which impurities form azeotropic boiling mixtures with benzene. If these impurities were allowed to remain in the benzene product, its premium quality would be lost. Alternatively, if the azeotropic mixtures were removed, expensive high efficiency fractionation would be required and the yield of premium quality benzene would be reduced. By returning these azeotropic mixtures of benzene and hydrocarbon impurities to reactor 44 the impurities are destroyed by hydrocracking and the high yields of premium quality benzene are produced.

The bottoms from the stabilizer 60 are taken at 66 as feed to the clay tower 68. The operating pressure of the stabilizer 60 is maintained at that necessary to give a bottoms temperature of about 425° F. This enables the bottoms 66 to go directly to the clay tower without intermediate heating. The stabilizer is furnished with a reboiler 64.

The clay tower effluent 69 goes directly to the benzene tower 70. This is a conventional fractionator operating at essentially atmospheric pressure and reboiled at 76. High purity benzene product is taken as the overhead product at 72. The bottoms 74 are preferably sent by line 77 to the recycle tower at 78.

Alternatively, where there are no heavy aromatics produced it is possible to take line 77 and use it directly as the lean oil feed to the vent hydrogen absorber 34.

The recycle tower 78 is run at atmospheric pressure. The overhead 79 is essentially rich in alkylated aromatics primarily toluene and water vapor. The overhead in 79 passes through condenser 81 and separator 84 with the water removed in 86. A portion of the toluene is returned to 78 and the remainder is set through line 80 to be used as the lean oil for the vent hydrogen absorber 34.

The bottoms 85 from the recycle tower 78 are heavy aromatics. The bottoms are recycled to combine with 77 in line 87, passing through heater 89 and entering 78. This prevents near total vaporization in 89. Steam is supplied at 83 for stripping. To prevent a buildup of these heavy compounds the excess bottoms are purged at 82.

The recycle tower overhead stream 80 is cooled by water at 32 and refrigerant at 33 to about 60° F. The amount of overhead 80 cooled to 60° F. is related to the effluent net flash vapor available at 53. The cooled liquid lean oil 88 is fed to vent hydrogen absorber 34 where it recovers benzene from the net vapor effluent 53.

The unconverted toluene, the quantity of which depends on per pass conversion, can be returned to the reactor 44 through either line 22 or line 36. The selection of bypass 22 or 36 is dictated by the lean oil requirements in vent hydrogen absorber 34. If extra lean oil is desired in 34, bypass 36 is used and all of line 80 is chilled and used as lean oil. If the lean oil demand is low, the unconverted toluene can be sent directly to the reactor via line 22 and in so doing, bypass the absorber 34. The rich oil in 31 combines with the net liquid from the reactor effluent flash drum 50 and is sent directly to the stabilizer 60 and then to the benzene tower 70 and recycle tower 78 for removal of the light components and benzene that were absorbed in 34. After removal of the absorbed material, the induced recycle in 80 is once again ready for use as a lean oil in 34.

In this invention, it was discovered that with a vaporous pyrolysis gasoline feed, lean oil recycle could be maintained independent of the output of the reaction zone 44. The inclusion of this recycle flow insures a continuous and positive lean oil flow that is rich in alkylated aromatics, such as toluene, to the vent hydrogen absorber 34 independent of the recycle that is returned to reactor 44. This toluene-rich lean oil supply to absorber 34 is needed to recover benzene from vapor effluent 53 and thereby increase the overall product yield. The new closed recycle circuit frees the requirement of the absorbed 34 for toluene from direct dependence upon the conversion of toluene to benzene in reactor 44. This adds both stability and flexibility to the operation of the system.

It will be understood that the foregoing description and disclosure does not include all of the customary valves, controls and interconduit heat exchangers but it will be appreciated that temperatures are readily controlled and heat recovered in the well-known manner.

Generally, hydrodealkylation operations are conducted in the temperature range of 1100 to 1500° F. to preferably 1100 to 1350° F. and temperature differences can be kept at 200° F. or less. The operating pressures are normally in the range of 500 to 800 p.s.i.g. preferably 500 to 650 p.s.i.g. with a reaction time within the period of 10 to 50 seconds. There will be at least two mols of hydrogen per mol of liquid aromatic feed.

Many modifications and alterations of the above described invention will become apparent to those skilled in the art, however, the scope of this invention should not be unduly restricted and is limited only by the claims.

I claim:

1. A process for the hydrodealkylation of an alkylated aromatic hydrocarbon feed selected from the group of vaporous feeds, feeds containing more than 1% benzene and nonaromatic hydrocarbons, and pyrolysis gasoline characterized by having insufficient lean oil to purify the hydrogen for recycle which comprises the steps of:
   (a) passing the feed and a hydrogen containing gas to a reaction zone;
   (b) operating the reaction zone at a temperature between about 1100 and about 1500° F. and at a pressure between about 500 and about 800 p.s.i.g.;
   (c) removing a vapor-liquid effluent stream from the reaction zone;
   (d) cooling said effluent;
   (e) feeding said effluent to a first separation zone wherein the hydrogen containing vaporous portion of the effluent, the treatment of which will hereinafter be described, is separated from the liquid containing portion of the effluent;
   (f) passing the liquid effluent to a second separation zone to obtain a light hydrocarbon gaseous effluent and a first liquid bottoms;
   (g) passing the first liquid bottoms to a third separation zone to obtain a benzene overhead effluent and a second liquid toluene rich bottoms;
   (h) feeding the hydrogen containing vapor from step (e) to an absorption zone;
   (i) contacting the hydrogen containing vapor with some of the second liquid bottoms from step (g) for absorption of the benzene in the vapor;
   (j) venting the hydrogen gas;
   (k) returning the liquid bottoms absorbent from the absorption zone without passing through the reaction zone to supplement the liquid effluent from step (e) to the second separation zone in step (f);
   (l) recovering the benzene as product from step (g).

2. The process in claim 1 wherein the second liquid bottoms from the third separation zone is passed to a fourth separation zone for removal of the heavy aromatics as a bottoms and the overhead from this separation is recycled for use as the liquid bottoms in step (i).

References Cited

UNITED STATES PATENTS

| | | | |
|---|---|---|---|
| 3,666,826 | 5/1972 | Newberger et al. | 260—672 R |
| 3,287,431 | 11/1966 | Feigelman | 260—672 NC |
| 3,188,359 | 6/1965 | Lempert et al. | 260—672 NC |
| 3,213,151 | 10/1965 | Sherk | 260—672 R |
| 3,260,765 | 7/1966 | Asselin | 260—672 NC |
| 3,291,849 | 12/1966 | King et al. | 260—672 NC |

CURTIS R. DAVIS, Primary Examiner

U.S. Cl. X.R.

260—672 NC